US005849838A

United States Patent [19]

Barlow

[11] Patent Number: 5,849,838
[45] Date of Patent: Dec. 15, 1998

[54] AQUEOUS SCRATCH COVER COMPOSITIONS FOR FINISHED WOODEN ARTICLES

[75] Inventor: Ian John Barlow, Wokingham, United Kingdom

[73] Assignee: S. C. Johnson & Son, Inc., Racine, Wis.

[21] Appl. No.: 428,247

[22] PCT Filed: Oct. 26, 1993

[86] PCT No.: PCT/US93/10194

§ 371 Date: Apr. 27, 1995

§ 102(e) Date: Apr. 27, 1995

[87] PCT Pub. No.: WO94/10237

PCT Pub. Date: May 11, 1994

[30] Foreign Application Priority Data

Oct. 28, 1992 [GB] United Kingdom ............ 9222672

[51] Int. Cl.$^6$ .................................. C08L 91/00
[52] U.S. Cl. ................. 524/804; 524/310; 524/311; 524/312; 524/313; 524/322; 524/556; 524/558; 106/3
[58] Field of Search ..................... 524/804, 322, 524/310, 311, 313, 312, 556, 558; 106/3

[56] References Cited

U.S. PATENT DOCUMENTS

| 2,687,963 | 8/1954 | Marshall | 106/7 |
|---|---|---|---|
| 3,836,371 | 9/1974 | Kokoszka | 106/10 |
| 3,847,622 | 11/1974 | Brandl et al. | 106/10 |
| 4,341,677 | 7/1982 | Tamosauskas | 523/421 |
| 4,758,641 | 7/1988 | Hsu | 526/208 |
| 4,771,094 | 9/1988 | Romberger | 524/310 |
| 4,810,407 | 3/1989 | Sandvich | 252/90 |
| 4,846,986 | 7/1989 | Trivett | 252/49.5 |
| 4,923,940 | 5/1990 | Hsu | 526/208 |
| 5,004,598 | 4/1991 | Lochhead et al. | 424/59 |
| 5,110,891 | 5/1992 | Cifuentes et al. | 528/34 |
| 5,154,759 | 10/1992 | Cifuentes et al. | 106/3 |

*Primary Examiner*—Marion McCamish
*Assistant Examiner*—John J. Guarriello

[57] ABSTRACT

Aqueous oil-in-water emulsion scratch cover compositions for covering scratches, blemishes and other damage to finished wooden articles such as furniture, wooden trim and wooden floors with characteristics comparable to volatile organic solvent-based scratch cover compositions are described which are substantially free of added volatile organic solvents and conventional surfactants. These emulsion compositions comprise 2–10% of an animal, vegetable or mineral oil that is a liquid and substantially nonvolatile at 25° C., 0.0001–1% of at least one organic solvent soluble dye that is soluble in the oil and is substantially water insoluble, an effective amount, preferably 0.01–5%, of a polymeric electrostatic emulsifier such as an acrylates/$C_{10}$–$C_{30}$ alkyl acrylate cross polymer that takes the place of conventional surfactants with the balance comprising water, and optionally, non-ionic waxes, nonionic nonvolatile silicone fluids, pigments or no more than about 1% of nonionic surfactants.

16 Claims, No Drawings

AQUEOUS SCRATCH COVER COMPOSITIONS FOR FINISHED WOODEN ARTICLES

TECHNICAL FIELD

This invention relates to an aqueous emulsion scratch cover composition for covering scratches in finished wooden furniture and other finished wooden articles that is substantially free of added volatile organic solvents and water-sensitive surfactants. The compositions are based upon a combination of an oil, a dye, optionally, a pigment, a wax or a silicone polymer, and a specific type of polymeric electrostatic emulsifier to obtain scratch cover compositions with appearance characteristics of the same order as conventional volatile organic solvent-based scratch cover compositions.

BACKGROUND ART

As the world becomes more ecologically conscious of the potential environmental harm done by volatile organic solvent-based products that release volatile organic solvents into the atmosphere, there is a greater desire to obtain substantially solvent-free compositions to replace such products. Unfortunately, the substitution of water-based compositions for solvent-based compositions in products often sacrifices favorable properties or increases the cost of such products because expensive materials or methods of manufacturing water-based products are required.

This is true in the field of scratch cover compositions for finished wooden furniture and similar finished wooden articles such as wooden trim, floors, decking and the like which are finished with transparent or translucent finishes which allow the natural beauty of the wood to be seen. The objective of such compositions is to get a dye into the wood beneath the scratch, blemish or other damaged area.

Traditional scratch cover compositions such as OLD ENGLISH® Scratch Cover sold by Reckitt & Colman Household Products of Wayne, N.J., USA rely on volatile organic solvents and oils to carry a dye into the wood. Another example of a conventional volatile organic solvent-based scratch cover composition is described in U.S. Pat. No. 2,687,963 to Marshall. Marshall teaches a combination scratch cover and polish formulation composed of paraffin oil, wax, coating material and a vehicle that may be a lacquer, varnish or other volatile organic solvent such as lacquer thinner, a lower aliphatic alcohol of from 1 to 6 carbon atoms or a naphthenic base oil.

Another type of conventional scratch cover composition is sold under the trademark SCRATCH COAT® by Fast Industries, Inc. of Fort Lauderdale, Fla., USA that is said to be a dye-free oil composition that is said to match scratches in all woods. Yet another commercial composition sold by Johnson Wax Espanola, S.A. of Madrid, Spain under the trademark PRONTO® Reparador is composed of mineral oil, nonionic surfactant, dyes, and fragrance.

Simply converting a volatile organic-solvent-based composition over to a water-based composition by removing the solvent and addition of a surfactant to provide water dispersibility is not an adequate remedy. The resulting aqueous composition is typically not as durable as its volatile organic solvent-based counterpart. This is due to the need for a water-sensitive surfactant to disperse or emulsify the ingredients into water. The surfactant remains in the film left behind on the wood and can result in removal of the scratch repair film when the furniture is cleaned with an aqueous polish composition or an aqueous detergent solution.

Additionally, the presence of the water in the scratch cover composition can interfere with ability of the wood to properly absorb the oil-based dyes and pigments used to cover the damaged wood. Aqueous emulsion scratch cover compositions also can have stability problems and thus a significant amount of surfactant must usually be added to retain product stability. That added surfactant further increases the water sensitivity of the resulting film left behind in the scratched wood.

Although some scratch cover compositions do not contain much, if any, volatile organic solvents, they must still be cleaned up with volatile organic solvents. A water-based product would be easier to clean up without such solvents.

Thus, there is still a need for a scratch cover composition for wooden furniture and other finished wooden articles that is substantially free of volatile organic solvents, but has properties comparable to conventional scratch cover compositions.

SUMMARY DISCLOSURE OF THE INVENTION

One object of the present invention is to provide an aqueous oil-in-water emulsion polish composition that has substantially, and preferably, no added volatile organic solvent or water-sensitive surfactants. Such compositions are particularly useful as a scratch cover composition for finished wooden furniture and other finished wooden articles. Another object of the present invention is to provide water-based emulsion polish compositions that possess good ability to cover scratches, blemishes and other damages to finished wooden articles as well as to leave the repaired wooden article with a polished film appearance that is comparable to or better than conventional scratch cover compositions containing volatile organic solvents. Yet another object of the present invention is to provide a water-based emulsion scratch cover composition with good durability against subsequent washing or cleaning operations using aqueous cleaners without any need for volatile organic solvents in the product or for subsequent clean-up operations.

These and other objects of the present invention are provided by an aqueous oil-in-water emulsion scratch cover composition for wooden furniture and other finished wooden articles comprising A. from about 2 to 10% by weight of the total composition of an organic animal, vegetable or mineral oil which is a liquid and substantially nonvolatile at 25° C., and more preferably from about 3% to 5%, and most preferably, about 5%;

B. from about 0.0001% to 1% by weight of the total composition of at least one organic solvent soluble dye which is soluble in the oil and is substantially water insoluble, and more preferably from about 0.0001% to 0.5% and most preferably from about 0.02% to 0.3%;

C. an effective amount, more preferably from about 0.01% to 5% of the total composition, and most preferably from about 0.05% to 0.5%, of a polymeric electrostatic emulsifier for forming oil-in-water emulsions which is a modified polymer, preferably lightly cross-linked, having a major portion of a monoolefinically unsaturated carboxylic acid monomer or its anhydride of 3 to 6 carbon atoms and a minor portion of a long chain alkyl acrylate or methacrylate monomer which polymer is neutralized with an effective amount of a base and is capable of dispersing (A) and (B) within D. water comprising the balance of the composition to form an oil-in-water emulsion wherein the composition is substantially free of any added volatile organic solvents and water-sensitive surfactants.

Additionally, such scratch cover compositions can preferably contain nonionic organic waxes or silicone polymers to provide a polish film in amounts of up to about 5% of each ingredient and, most preferably, from about 1% to 2%. Optionally, small amounts of non-water dispersible pigments can be added to provide further color matching of the wood finish in amounts of from about 0.01% to 1%. A fragrance or perfume also can be added in amounts of from about 0.1% to 1%.

BEST MODE FOR CARRYING OUT THE INVENTION

The aqueous oil-in-water scratch cover compositions of the present invention require three ingredients in addition to the water that forms the balance of the composition. Deionized water, distilled water or low mineral content, soft tap water is preferred to obtain compositions where the emulsion breaks quickly to deliver the dye-containing oil to the wood exposed by a scratch before the water can soak into the wood. The percentages given herein are based upon non-volatile solids (actives) content unless otherwise specified.

The first required ingredient is from about 2% to 10% percent by weight of the total composition of an organic animal, vegetable or mineral oil that is a liquid at 25° C. so it can flow and carry the dye into the wood substrate exposed by the scratch. The oils are substantially non-volatile at 25° C. so they are retained within the wood. The oil used must be capable of dissolving the organic solvent soluble dyes used to restore the original color of the wood. They also act as carriers for the dyes and any pigments that may optionally be included to assist in coloring the wood. Examples of animal oils are fish oil, menhaden oil, beef tallow oil, mutton tallow oil and the like. Examples of vegetable oils are sunflower oil, linseed oil, soybean oil, tung oil, safflower oil, coconut oil, palm kernel oil, olive oil and other oils commonly used in paints and varnishes. Sunflower oil is presently preferred. Examples of mineral oils are hydrocarbon oils such as technical white oil, Bayol® from Exxon Corporation of Houston, Tex., U.S.A., and Carnation oil from Witco Chemical Corporation, Sonneborn Division of New York, N.Y., as well as other synthetic oils such as isopropyl myristate and di-n-octyl ether sold as RILANIT® KE 2683 from Henkel KGaA, R-CF Dehydag, of Dusseldorf, Germany. More preferably, the oils are used in amounts of from about 3% to 5%, and most preferably, about 5% of the total composition.

The next required ingredient is an organic solvent soluble dye that is soluble in the oil and is substantially water insoluble so it is retained within the wood. Water soluble dyes may not be absorbed by the wood beneath the scratch and, being significantly ionic, may serve to render the aqueous emulsion composition more unstable. Generally, "water insoluble dyes" are those which are less than about 0.5% by weight soluble in water at 25° C. Mixtures of dyes may be used to match the type of wood finish to be repaired. Selection of the proper combination of dyes of the above type to obtain a color match is well known to those of ordinary skill in the art and forms no part of this invention. The dyes are present in an amount of from about 0.0001% to 1% by weight of the total composition, and more preferably from about 0.0001% to 0.5% and most preferably from about 0.02% to 0.3%. Examples of suitable dyes are disperse dyes; Fat Red 5B, Fat Yellow GGN, and Fat Black HB from Hoechst AG of Frankfurt, Germany; Oilsol Black and Oilsol Bismarck Brown from Morton International of Hounslow, United Kingdom; and Neopen Black X58 and Neozapon Brown 258 from BASF AG of Ludwigshafen, Germany. The third required ingredient is an effective amount of a polymeric electrostatic emulsifier for forming oil-in-water emulsions. The polymeric electrostatic emulsifier must have a combination of hydrophilic groups that provide compatibility with the water and hydrophobic groups such as long chain alkyl (8 or more carbon atoms) groups that enable the polymeric electrostatic emulsifier to associate with the less hydrophilic or substantially hydrophobic ingredients to form an emulsion. The hydrophilic groups present are preferably carboxyl groups that can be neutralized to a salt form by the addition of a base to render them strongly hydrophilic. Thus, the polymeric electrostatic emulsifier is a modified polymer, preferably lightly cross-linked, having a major portion of a monoolefinically unsaturated carboxylic acid monomer or its anhydride of 3 to 6 carbon atoms and a minor portion of a long chain alkyl acrylate or methacrylate monomer. More preferably, from about 0.01% to 5% of the total composition is a polymeric electrostatic emulsifier and, most preferably, from about 0.05% to 0.5% is present.

A preferred polymeric electrostatic emulsifier possessing such characteristics is the class of polymeric electrostatic emulsifier referred to as "electrostatic emulsifiers" sold as CARBOPOL® 1342 and the CARBOPOL® "1600" series of products by The BFGoodrich Company, Specialty Polymers & Chemicals Division, Brecksville, Ohio, USA and under the PEMULEN® trademark in Europe by the same company as PEMULEN® TR-1 and TR-2. The manufacturer describes these polymeric electrostatic emulsifiers as being predominantly high molecular weight polyacrylic acid polymers that have a large water-loving (hydrophilic) portion and a smaller oil-loving (oleophilic or hydrophobic) portion that permits these polymers to act as primary emulsifiers in oil-in-water emulsions. The Cosmetics, Toiletry and Fragrance Association ("CTFA") designation for these polymers is Acrylates/$C_{10}$–$C_{30}$ alkyl acrylate cross polymer. The 1600 series of CARBOPOL® emulsifiers include CARBOPOL® 1610 having a typical viscosity of 18,000 centipoise (18 Pa.s) at 1% concentration in water at a pH of 7 at room temperature (25° C.); CARBOPOL® 1621 (also designated PEMULEN® TR-1) having a typical viscosity of 5,000 centipoise (5 Pa.s) at 1% concentration in water at a pH of 7 at room temperature (25° C.); CARBOPOL® 1622 (also designated PEMULEN® TR-2) which is said to have outstanding emulsifying ability over a broad range of oil/water concentrations with minimal thickening effect and contains the highest level of hydrophobic groups of the four 1600 series products noted here; and CARBOPOL® 1631 that is said to be the most ion-resistant of the four 1600 series polymers noted here and contains mineral spirits that makes this product undesirable for use in the present invention. PEMULEN® TR-1 (CARBOPOL® 1621) and PEMULEN® TR-2 (CARBOPOL® 1622) are presently preferred for use in the present invention. These electrostatic emulsifiers differ from other polyacrylic acid thickening polymers such as the well known "900" series of CARBOPOL® resins sold by BFGoodrich for use as thickeners because of the presence of the hydrophobic groups as noted in column 9, lines 50–65 of U.S. Pat. No. 5,004,598 noted below.

These polymeric electrostatic emulsifiers appear to be described in BFGoodrich's U.S. Pat. Nos. 5,004,598 to Lochhead et al.; 4,923,940 to Hsu; and 4,758,641 to Hsu that are hereby incorporated by reference to further teach such polymeric electrostatic emulsifiers. These patents characterize such polymers being composed of from 50–99% by weight of the total monomers, more preferably 80–99%, and most preferably, 90–98% by weight of one or more of the carboxylic monomers noted above such as acrylic acid, methacrylic acid and maleic anhydride; from 1–50% by weight of the total monomers, preferably 1–20%, and most preferably, 2–10% by weight of one or more acrylate esters or methacrylate esters having long chain alkyl groups of from about 10 to 30 carbon atoms such as decyl acrylate, lauryl acrylate, stearyl acrylate, behenyl acrylate, and melissyl acrylate and the corresponding methacrylates; and, optionally, but preferably, a small amount, up to about 5%, more preferably 0.1–2%, of a cross-linking agent having two or more unsaturated groups such as 0.1–1.4% allyl pentaerythritol; 0.1–0.8% allyl acrylate; 0.1–1.4% allyl sucrose and 0.4–2.5% trimethylol propane diallylether. Cross-linking of the polymers is said to provide improved ability for the copolymers to swell. A specific example of one such polymer is given in Example 1 of the '598 Patent as being the polymerization product of 250.28 grams of acrylic acid, 5.72 grams of stearyl methacrylate and 0.858 grams of allyl pentaerythritol. According to the CTFA International Cosmetic Ingredients Dictionary (1991), PEMULEN® TR-1 and TR-2 are listed with CARBOPOL® 1342 as being a copolymer of $C_{10}$–$C_{30}$ alkyl acrylates and one or more monomers of acrylic acid, methacrylic acid or one of their simple esters cross-linked with an allyl ether of sucrose or an allyl ether of pentaerythritol.

An effective amount, typically from about 80% to 100% of the stoichiometric amount, of carboxylic acid groups present in the polymeric electrostatic emulsifier are neutralized to render the emulsifier more hydrophilic. Such neutralization is preferably done with an alkaline neutralizing agent such as an organic base such as amino alcohols such as triethanolamine, 2-amino-2-methyl-1-propanol ("AMP"), and 2-amino-2-methyl-1,3-propanediol and organic amines of from 2 to 22 carbon atoms such as triethylamine and laurylamine. Inorganic bases such as ammonium hydroxide, sodium hydroxide and the like are less preferred for reasons of emulsion stability. Volatile neutralizing agents will contribute to longer polish film stability since the neutralizing agent can evaporate away and leave the polymeric emulsifier less sensitive to water after the polish film has dried on a substrate. Amino-functional organic amines are presently preferred as neutralizing agents and AMP is presently the most preferred neutralizing agent.

Sufficient neutralizing agent is used to give a pH to the total composition of from about 4 to 10 with a pH of about 8 being more preferable. The pH of the composition has an effect on viscosity with higher pH compositions being more viscous. When the pH is less than about 4, the composition has a very low viscosity and may not be sufficiently stable. At greater than a pH of about 10, the viscosity begins to decrease.

The polymeric electrostatic emulsifier is used to take the place of added surfactants that would be used in aqueous emulsion compositions to disperse the hydrophobic ingredients in the water. Conventional surfactants can result in decreased durability upon exposure to water and detergents. The dyes may even be leached from the wood surface if an excessive amount of them is used. If too little polymeric electrostatic emulsifier is used, the stability of the aqueous emulsion scratch cover composition suffers. The use of too much polymeric electrostatic emulsifier may undesirably thicken the composition, render the resulting films more sensitive to the effects of water and detergents, and add unnecessary expense to the scratch cover compositions. Most preferably, from about 0.05% to 0.5% by weight of the polymeric electrostatic emulsifier is used.

Optionally, a small amount of a nonionic surfactant may additionally be present to improve emulsion stability and reduce the particle size of the dye-containing oil. No more than about 1% by weight and more preferably, no more than about 0.5%, of such surfactants should be included. This is what is meant by "substantially free of water-sensitive surfactants". More than that amount tends to make the emulsion too stable or too viscous for good application. If the emulsion is too stable, it will not efficiently break upon contact with the wood underlying the scratch and permit the dye-containing oil to penetrate the wood. Ionic surfactants should be avoided because they detrimentally affect emulsion stability.

Nonionic surfactants are well known and commercially available. Examples of such surfactants are polyethoxylated fatty alcohols containing a long chain alkyl group of from about 8 to 22 carbon atoms such as UNITHOX® 420 (ethoxylated $C_{30}$ primary alcohol containing an average of 2.6 moles of ethoxy groups per molecule), ULITHOX® 450 (ethoxylated $C_{30}$ primary alcohol containing an average of 10 moles of ethoxy groups per molecule), and UNITHOX® 750 (ethoxylated $C_{30}$ primary alcohol containing an average of 16 moles of ethoxy groups per molecule) from Petrolite Specialty Polymers Group of Tulsa, Okla., USA, sorbitan esters of fatty acids containing from about 8 to 22 carbons such as sorbitan monooleate sold as SPAN® 80 and the other such surfactants sold under the SPAN trademark by ICI Surfactants (Belgium) of Everberg, Belgium, and sorbitan esters of polyethoxylated fatty acids containing from about 8 to 22 carbons which are sold under the TWEEN® trademark by ICI Surfactants (Belgium).

An optional, but preferred, additional ingredient is a conventional wax of the type commonly used in polish compositions that is essentially nonionic in character. Examples of waxes that may be useful in the aqueous emulsion scratch-cover compositions of the present invention are synthetic and naturally derived nonionic waxes such as paraffin wax, carnauba wax, ozokerite wax, montanic ester wax, polyethylene and polypropylene waxes, microcrystalline waxes, beeswax, hydrogenated castor oil and the like. If the waxes have a melting point above about 85° C., then they must be added as an emulsion using a small amount of a nonionic surfactant since the polymeric electrostatic emulsifier tends to break down if it is heated above about 85° C. during production of the scratch cover composition. Any such waxes are included in the compositions of the present invention in amounts of up to about 5% of the total composition and more preferably, up to no more than about 2–3% at which point the wax tends to make the scratch cover composition viscous. Most preferably about 1–2% is present. The wax is used to impart a polished film to the repaired area so that it blends in better with the remainder of the finished wood surface.

In place of or in addition to the waxes, another optional ingredient that can be included in the compositions of the present invention is a nonionic, nonvolatile silicone fluid for glossy film formation. These fluids are substantially nonvolatile, water insoluble and fluid at 25° C. Examples of useful silicone fluids are polydiorganosiloxanes such as the polydimethylsiloxane fluids (CTFA designation: dimethicone) sold by General Electric Company, Silicone Products Division, of Waterford, N.Y., USA, and by Dow Corning Corporation of Midland, Mich., USA under the designation DOW CORNING® 200 Fluid. Such fluids generally have viscosities of from about 50 up to about 50,000 centistokes (0.00005 to 0.05 square meters per second i.e., "$m^2$/sec") at 25° C. and more preferably, from about 50 centistokes ($m^2$/sec) up to about 20,000 centistokes ($m^2$/sec). Any such silicone fluids are included in the compositions of the present invention in amounts of up to about 5% of the total composition and more preferably, up to no more than about 2–3% at which point the silicone tends to make the scratch cover composition viscous. Most preferably, about 1–2% is present. The silicone is used in place of or in addition to the wax to impart a polished film to the repaired area so it blends in better with the remainder of the finished wood surface.

In addition to the dyes, optionally, from about 0.01% to 1% by weight of the total composition of finely divided non-water dispersible pigments also can be-included to assist in matching the color of the underlying wood to the finished wood surface. The pigments used must be capable of being stably dispersed within the oil present in the scratch cover composition of the present invention. Pigments of the type commonly used in stains for wood may be of some value such as titanium dioxide, especially when added as a nonaqueous dispersion such as in a $C_{12}$–$C_{15}$ alkyl benzoate dispersant. The use of pigments is not as satisfactory as dyes since the wood does not absorb the pigment particles and they may subsequently be removed upon later cleaning or polishing. Varnishing the covered scratch may be preferable when compositions containing pigments are used.

Further additional minor amounts of compatible, conventional scratch cover composition additives can be used in amounts of no more than about one percent of the total emulsion polish composition such as preservatives, fragrances, and thickening agents such lightly cross-linked polyacrylic acid polymers such as CARBOPOL® 941or 980 that bear the CTFA designation of "Carbomer" resins. Thickening agents may be desirable when pigments are used since they car assist in suspending the pigments within the aqueous emulsion scratch cover composition.

INDUSTRIAL APPLICABILITY

The aqueous emulsion scratch cover compositions of the present invention are typically made by charging to a first mixing vessel (i.e., a stirrer-equipped, preferably an anchor stirrer, vessel capable of heating the contents placed inside) the hydrophobic ingredients such as the dyes, oil, any silicone fluid, and any wax, plus any additional nonionic surfactant, and mixing with heating to about 60° C.–80° C. depending upon the materials to be incorporated since some waxes have higher melting points than others as noted in the Examples. When the ingredients are homogeneously mixed, the polymeric electrostatic thickener is added. The temperature is not allowed to exceed 85° C. since the polymeric electrostatic emulsifier may tend to clump together with the dyes at a higher temperature. After the polymeric electrostatic emulsifier is incorporated into the mixture, any perfume is added. The water is added to a second separate mixing vessel and heated to about 60° C.–80° C. The contents of the first mixing vessel are then added to the water in the second vessel with vigorous stirring. A paddle or propeller stirrer is preferred for use in the second mixing vessel over a high shear stirrer. A high shear stirrer tends to reduce the ability of the electrostatic emulsifier to form a good emulsion. The temperature of the second mixing vessel should not be allowed to fall below about 60° C.–75° C. during the addition phase. If no waxes or other solid, meltable ingredients are used, heating may not be necessary. In any event, the temperature of the contents of the first mixing vessel should be kept at about the same temperature as the contents of the second mixing vessel to minimize precipitation of the ingredients during formation of the emulsion. Vigorous stirring is continued for at least five minutes to ensure the formation of a homogeneous dispersion. The neutralizing agent is then added very slowly while the stirring is continued. Addition of the neutralizing agent causes the contents of the mixing vessel to thicken. The emulsion quality is controlled by the degree of stirring taking place during the addition of the neutralizing agent. The neutralizing agent is added until the desired level of viscosity is reached, usually at a pH of about 8–8.5. The mixing speed can be reduced after all the neutralizing agent is added. The composition is then cooled to 20° C. with stirring. If a preservative is to be added, it is added when the stirring composition has been cooled to 20° C.

If a wax having a melting point above about 85° C. is to be used, it may advantageously be added in the form of an aqueous nonionic surfactant emulsion after the aqueous emulsion scratch cover composition has been prepared as described above. This does have the disadvantage of introducing small amounts of less desirable conventional surfactants into the emulsion polish compositions of the present invention.

The emulsion scratch cover compositions of the present invention can take the form of liquids, gels or pastes depending upon the desired form for the product by adjusting the levels of polymeric electrostatic emulsifier and neutralizing agent as well as by adding optional thickening agents. Liquid scratch cover products typically have a viscosity of about 1,000–1,500 centipoise (1–1.5 pascal.seconds). They are especially useful for covering scratches and blemishes in finished wood products such as wooden cabinets and furniture as well as for finished wooden trim, floors and decks where the transparent or translucent finish allows the appearance of the wood to show through as opposed to an opaque painted surface.

The following Examples are provided to show various aspects of the present invention without departing from the scope and spirit of the invention. Unless otherwise indicated, all parts and percentages used in the Examples are by weight. In the Examples, the viscosities reported were to be run at 20° C. with a Brookfield Viscometer Model LVT using a #3 spindle at 30 rpm. The non-volatile solids reported were to be determined using 2 grams of the material placed in an oven at 145° for 60 minutes.

EXAMPLES 1–3

The following aqueous emulsion scratch cover compositions were made to illustrate compositions for use on surfaces having a light-colored finish (Example 1), a medium-colored finish (Example 2) and a dark-colored finish (Example 3).

|  | Example: | | |
| --- | --- | --- | --- |
|  | 1 | 2 | 3 |
| Fat Red 5B (dye) | 0.001 | 0.005 | 0.030 |
| Fat Yellow GGN (dye) | 0.020 | 0.025 | 0.100 |
| Fat Black HB (dye) | 0.001 | 0.005 | 0.030 |
| Sunflower Oil | 5.000 | 5.000 | 5.000 |
| PEMULEN ® TR-1 | 0.080 | 0.080 | 0.080 |
| Dimethicone, 100 centistokes (0.0001 $m^2$/sec) | 2.500 | 2.500 | 2.500 |
| Dimethicone, 12,500 centistokes | 0.250 | 0.250 | 0.250 |

-continued

|  | Example: | | |
|---|---|---|---|
|  | 1 | 2 | 3 |
| (0.0125 m²/sec) |  |  |  |
| Microcrystalline Paraffin Wax (68°–72° C. melting point) | 0.500 | 0.500 | 0.500 |
| HOECHST ® KSL Wax[1] | 0.200 | 0.200 | 0.200 |
| SPAN ® 80 | 0.250 | 0.250 | 0.250 |
| Fragrance | 0.400 | 0.400 | 0.400 |
| Deionized Water | 90.608 | 90.595 | 90.470 |
| AMP (90% actives) | 0.090 | 0.090 | 0.090 |
| BODOXIN ® Preservative[2] | 0.100 | 0.100 | 0.100 |
| Total | 100.000% | 100.000% | 100.000% |

[1]. Montanic ester wax from Hoechst Celanese Corporation of Charlotte, North Carolina, USA.
[2]. Preservative (1,6-dihydroxy-2,5-dioxahexane dihydroxymethylenurea) from Bode Chemie GmbH & Company of Hamburg, Germany.

These aqueous emulsion scratch cover compositions are each made by charging the following into a first mixing vessel equipped with an anchor stirrer and capable of heating the contents placed inside: the three dyes, sunflower oil, dimethicones, waxes and SPAN® 80. The contents of the first mixing vessel are mixed with heating to about 80° C. When the ingredients are homogeneously mixed, the PEMULEN® TR-1 polymeric electrostatic thickener is added with stirring. The temperature of the first mixing vessel is not allowed to exceed 85° C. After the polymeric electrostatic emulsifier is, incorporated into the mixture, the fragrance is added.

The water is added to a second separate mixing vessel containing a paddle stirrer and heated to about 80° C. The contents of the first mixing vessel are then added to the water in the second vessel with vigorous stirring. The temperature of the second mixing vessel is not allowed to fall below about 75° C. during the addition phase. Vigorous stirring is continued for at least five minutes to ensure the formation of a homogeneous dispersion. The AMP neutralizing agent is then added very slowly while the stirring is continued. The neutralizing agent is added until the desired level of viscosity is reached, usually at a pH of about 8–8.5. The mixing speed can be reduced after all the neutralizing agent is added. The composition is then cooled to 20° C. with stirring and the BODOXIN® preservative is added. The resulting aqueous emulsion scratch cover composition is then packaged for use. The targeted characteristics are: pH of 8.0–8.5, Brookfield viscosity of 1,000–1,500 centipoise (1–1.5 pascal.seconds), non-volatile content of 8.5%–9.5%, and density at 20° C. of 0.97–0.99.

The composition is simply wiped over a scratch or blemish on a finished piece of wood using a cloth to enable the composition to contact the underlying damaged wood and color the scratch to substantially the original color of the finish. The repaired area is then buffed with a dry cloth to remove excess composition and to buff the scratch to give the damaged area a polished appearance.

EXAMPLE 4

This Example illustrates a basic aqueous emulsion scratch cover formulation that is free of any additional waxes and silicone fluids.

| Fat Red 5B (dye) | 0.07 |
|---|---|
| Fat Yellow GGN (dye) | 0.14 |

-continued

| Fat Black HB (dye) | 0.10 |
|---|---|
| Sunflower Oil | 5.00 |
| PEMULEN ® TR-1 | 0.20 |
| Distilled Water | 94.49 |
| Total | 100.00 grams |

This composition was prepared by first mixing the dyes and sunflower oil together in a mixing vessel equipped with a paddle stirrer. Then the PEMULEN® TR-1 polymeric electrostatic thickener was added with stirring. When the thickener was well dispersed within the mixture, the water was added to the contents of the mixing vessel with stirring to form a suspension of oil in water. Two to three drops of AMP (90% Actives) were added to the stirring mixture and the composition gelled. The pH of the composition was about 5. The resulting gelled composition was tested against a commercial product, PRONTO® Reparador, and was found to be equivalent to the commercial product in its ability to cover scratches in finished wooden products.

EXAMPLES 5–9

These Examples demonstrate the use of different waxes and silicones in aqueous emulsion scratch cover compositions of the present invention.

|  | Example: | |
|---|---|---|
|  | 5 | 6 |
| Fat Red 5B (dye) | 0.07 | 0.07 |
| Fat Yellow GGN (dye) | 0.14 | 0.14 |
| Fat Black HB (dye) | 0.10 | 0.10 |
| Sunflower Oil | 5.00 | 5.00 |
| Carnauba Wax, Light North Country, Type 3 | 1.00 | — |
| Paraffin Wax (54°–57° C. Melting Point) | — | 1.00 |
| Ozokerite Wax | — | — |
| Dimethicone, 100 centistokes (0.0001 m²/sec) | — | — |
| PEMULEN ® TR-1 | 0.20 | 0.20 |
| Deionized Water | 93.49 | 93.49 |
| Total | 100.00 g | 100.00 g |

|  | Example: | | |
|---|---|---|---|
|  | 7 | 8 | 9 |
| Fat Red 5B (dye) | 0.07 | 0.07 | 0.07 |
| Fat Yellow GGN (dye) | 0.14 | 0.14 | 0.14 |
| Fat Black HB (dye) | 0.10 | 0.10 | 0.10 |
| Sunflower Oil | 5.00 | 5.00 | 5.00 |
| Carnauba Wax, Light North Country, Type 3 | — | — | — |
| Paraffin Wax (54°–57° C. Melting Point) | — | — | 1.00 |
| Ozokerite Wax | — | 1.00 | — |
| Dimethicone, 100 centistokes (0.0001 m²/sec) | 1.00 | — | 1.00 |
| PEMULEN ® TR-1 | 0.20 | 0.20 | 0.20 |
| Deionized Water | 93.49 | 93.49 | 92.49 |
| Total | 100.00 g | 100.00 g | 100.00 g |

These compositions were made in the same manner as used for Example 4 with the following-exceptions.

In Example 5, the mixture containing the carnauba wax was heated to about 65°–70° C. The water was heated to 70° C. before it was added to the stirring mixture containing the dyes, oil and carnauba wax. The resulting composition was a gel that worked as a scratch cover composition but the gel was not entirely satisfactory. Attempts to thicken Example 5 using an additional amount of a clay thickener caused the emulsion to break. Use of an additional amount of a CARBOPOL® 941 thickener did not further thicken the composition to any significant degree.

Examples 6 and 9 containing paraffin wax were made by heating the mixture of hydrophobic ingredients, and, separately the water, to 60° C. to adequately melt the paraffin and permit it to be dispersed.

Example 8 containing ozokerite wax was made by heating the mixture of hydrophobic ingredients, and, separately the water, to 80° C. to adequately melt the ozokerite wax and permit it to be dispersed.

EXAMPLE 10

This comparative Example demonstrates the disadvantages of using a nonionic surfactant-based aqueous emulsion scratch cover composition.

| | |
|---|---|
| Potassium Hydroxide (50% in water) | 0.074 |
| Formaldehyde (preservative) | 0.250 |
| KATHON ® 886 MW (preservative)[1] | 0.005 |
| SPAN ® 80 | 0.200 |
| TWEEN ® 80[2] | 0.400 |
| Dimethicone, 500 centistokes (0.0005 m$^2$/sec) | 2.250 |
| CARBOPOL ® 941[3] (thickener) | 0.250 |
| ISOPAR ® H (hydrocarbon solvent) | 5.000 |
| Soft Water | 90.461 |
| Cardis Wax 314[4] | 0.070 |
| Beeswax | 0.215 |
| HOECHST ® RT Wax[5] | 0.215 |
| Fragrance | 0.300 |
| Fat Red 5B (dye) | 0.070 |
| Fat Yellow GGN (dye) | 0.140 |
| Fat Black HB (dye) | 0.100 |
| Total | 100.000 grams |

[1]. 5-Chloro-2-methyl-4-isothiazolin from Rohm and Haas France, S.A. of Valbonne-Cedex, France.
[2]. Polysorbate 80 from ICI Surfactants (Belgium).
[3]. Carbomer 941 from BFGoodrich.
[4]. Oxidized hydrocarbon wax of acid number 18 from Petrolite.
[5]. Montanic ester wax from Hoechst Celanese.

This Example did not contain an oil, but used the hydrocarbon solvent and dimethicone to dissolve the dyes and carry them into the wood. It was found that the dyes could, to some extent, be removed from the scratched area with a conventional furniture polish: PLEDGE® furniture polish from S. C. Johnson & Son, Inc. of Racine, Wis., USA. It was visually noted that the PLEDGE® furniture polish tended to remove more of the coloring from wood scratches treated with Example 10 than when the PLEDGED was used on scratches treated with either the PRONTO® Reparador or Example 4.

EXAMPLES 11–12

These Examples demonstrate the use of PEMULEN® TR-2 as a polymeric electrostatic emulsifier in the compositions of the present invention to make low viscosity liquid compositions.

| | Example: | |
|---|---|---|
| | 11 | 12 |
| Fat Red SB (dye) | 0.07 | 0.07 |
| Fat Yellow GGN (dye) | 0.14 | 0.14 |
| Fat Black HB (dye) | 0.10 | 0.10 |
| Sunflower Oil | 5.00 | 5.00 |
| PEMULEN ® TR-2 | 0.20 | 0.10 |
| Deionized Water | 94.49 | 94.59 |
| Total | 100.00 g | 100.00 g |

These Examples were made in the same manner as used for Example 4. The pH of each composition was between 4–5. Both Examples produced aqueous emulsion scratch cover compositions that were low viscosity liquids. Example 11 was very stable and the emulsion did not break as well to deliver the dye to the wood underlying a scratch as did Example 12. Example 12 was judged to be equal in performance to Example 4 in its ability to cover a scratch in a finished wooden surface.

EXAMPLES 13–14

These Examples demonstrate the use of PEMULEN® TR-2 as a polymeric electrostatic emulsifier along with additional nonionic surfactant in the compositions of the present invention.

| | Example: | |
|---|---|---|
| | 13 | 14 |
| Fat Red 5B (dye) | 0.07 | 0.07 |
| Fat Yellow GGN (dye) | 0.14 | 0.14 |
| Fat Black HB (dye) | 0.10 | 0.10 |
| Sunflower Oil | 5.00 | 5.00 |
| SPAN ® 80 | 0.50 | 0.50 |
| PEMULEN ® TR-2 | 0.20 | 0.10 |
| Deionized Water | 93.99 | 94.09 |
| Total | 100.00 g | 100.00 g |

These Examples were made in the same manner as used for Example 4. Both Examples produced aqueous emulsion scratch cover compositions that were thick gels where Example 14 was less viscous than Example 13. Example 13 appeared to have a higher viscosity than did Example 11 and Example 14 appeared to have a higher viscosity than Example 12. The amount of AMP added to these compositions was studied and it was found when sufficient AMP was added to bring the pH above about 5, these formulations gave good viscous gels. Lower amounts of AMP tended to give grainy gels that disappeared as the level of AMP added was increased. At about a pH of 10, the viscosity of such formulations began to decrease.

EXAMPLES 15–17

These Examples demonstrate the use of different nonionic surfactants in aqueous emulsion scratch cover compositions.

| | Example: | | |
|---|---|---|---|
| | 15 | 16 | 17 |
| UNITHOX ® 420 | 1.00 | — | — |
| UNITHOX ® 450 | — | 1.00 | — |
| UNITHOX ® 750 | — | — | 1.00 |

-continued

| | Example: | | |
|---|---|---|---|
| | 15 | 16 | 17 |
| Sunflower Oil | 5.00 | 5.00 | 5.00 |
| Fat Red 5B (dye) | 0.07 | 0.07 | 0.07 |
| Fat Yellow GGN (dye) | 0.14 | 0.14 | 0.14 |
| Fat Black HB (dye) | 0.10 | 0.10 | 0.10 |
| PEMULEN ® TR-1 | 0.20 | 0.20 | 0.20 |
| Deionized Water | 93.49 | 93.49 | 93.49 |
| Total | 100.00 g | 100.00 g | 100.00 g |

These examples were made in the same manner as in Example 4. It was found that as the molecular weight of the UNITHOX® surfactants increased (750 being the highest and 420 being the lowest), the thickness and pasty appearance of the resulting composition increased. Example 17 was the most stable of the three compositions and was least efficient at permitting the dyes and oil to be transferred to the wood surface exposed by the scratch. Apparently, the nonionic surfactant stabilizes the emulsion and interferes with the emulsion's ability to break when placed in contact with the wood surface to be covered. Thus, small amounts of nonionic surfactant would be more desirable if one desires to use them.

That which I claim is:

1. An aqueous oil-in-water emulsion scratch cover composition having a pH of 4.0 to 10.0 for finished wooden articles, comprising
   A. from about 2 to 10% by weight of the total composition of an organic animal, vegetable or mineral oil which is a liquid and essentially nonvolatile at 25° C.;
   B. from about 0.0001 to 1% be weight of the total composition of at least one organic solvent soluble dye which is soluble in the oil and is essentially water insoluble;
   C. from about 0.01 to about 5% by weight of the total composition of a polymeric electrostatic emulsifier effective to form an oil-in-water emulsion, the polymeric electrostatic emulsifier comprising a modified polymer having a major portion of a monooelefinically unsaturated carboxylic acid monomer or its anhydride of 3 to 6 carbon atoms and a minor portion of a long chain alkyl acrylate or methacrylate monomer which polymer disperses (A) and (B) within
   D. at least 84% water comprising the balance of the composition to form an oil-in-water emulsion wherein the composition is essentially free of any added volatile organic solvents and water-sensitive surfactants.

2. The composition as claimed in claim 1 wherein the composition contains from about 0.01% to 5% by weight of a polymeric electrostatic emulsifier that is an acrylates/$C_{10}$–$C_{30}$ alkyl acrylate cross polymer.

3. The composition as claimed in claim 1 wherein the oil is a vegetable oil selected from the group consisting of sunflower oil, linseed oil, soybean oil, tung oil, safflower oil, coconut oil, palm kernel oil, and olive oil.

4. The composition as claimed in claim 1 further comprising a nonionic surfactant in an amount from about 0% to no greater than 1% by weight of the total composition.

5. The composition as claimed in claim 1 wherein the composition further contains at least one synthetic or naturally derived nonionic wax in an amount from about 0% to no greater than 5% by weight of the total composition.

6. The composition as claimed in claim 1 wherein the composition further contains a nonionic silicone fluid that is essentially water insoluble, essentially nonvolatile, and has a viscosity of from about 50 centistokes (0.00005 $m^2$/sec) up to 50,000 centistokes (0.05 $m^2$/sec) at 25° C. in an amount from about 0% to no greater than 5% by weight of the total composition.

7. The composition as claimed in claim 1 which further comprises from about 0.01% to 1% by weight of the total composition of at least one finely divided pigment stably dispersed within the oil.

8. An aqueous oil-in-water emulsion scratch cover composition having a pH of 4.0 to 10.0 for finished wooden articles comprising
   A. from about 2 to 10% by weight of the total composition of an organic vegetable oil which is a liquid and essentially nonvolatile at 25° C.;
   B. from about 0.0001 to 1% by weight of the total composition of at least one organic solvent soluble dye which is soluble in the oil and is essentially water insoluble;
   C. from about 0.01 to about 5% by weight of the total composition of a polymeric electrostatic emulsifier effective to form an oil-in-water emulsion, the polymeric electrostatic emulsifier comprising a modified polymer having a major portion of a monooelefinically unsaturated carboxylic acid monomer or its anhydride of 3 to 6 carbon atoms and a minor portion of a long chain alkyl acrylate or methacrylate monomer which polymer disperses (A) and (B) within
   D. at lesat 84% water comprising the balance of the composition to form an oil-in-water emulsion wherein the composition is essentially free of any added volatile organic solvents and water-sensitive surfactants.

9. The composition as claimed in claim 8 wherein the polymeric electrostatic emulsifier is an acrylates/$C_{10}$–$C_{30}$ alkyl acrylate cross polymer and the amount of dye is from about 0.0001% to 0.5%.

10. The composition as claimed in claim 9 wherein the oil is present in an amount from about 3% to 5% and the oil is selected from the group consisting of sunflower oil, linseed oil, soybean oil, tung oil, safflower oil, coconut oil, palm kernel oil, and olive oil.

11. The composition as claimed in claim 10 wherein the oil is sunflower oil.

12. The composition as claimed in claim 10 wherein the composition further contains at least one synthetic or naturally derived nonionic wax having a melting point of no more than about 85° C. in an amount from about 0% to no greater than about 3% by weight of the total composition.

13. The composition as claimed in claim 10 wherein the composition further contains a dimethicone that is essentially water insoluble, nonvolatile and has a viscosity of from about 50 centistokes (0.00005 $m^2$/sec) up to about 20,000 centistokes (0.02 $m^2$/sec) at 25° C. in an amount from about 0% to no greater than about 3% by weight of the total composition.

14. The composition as claimed in claim 10 further containing a nonionic surfactant in an amount from about 0% to no greater than 0.5% by weight of the total composition.

15. The composition as claimed in claim 10 which further contains from about 0.01% to 1% by weight of the total composition of at least one finely divided pigment that is stably dispersed within the oil.

16. The composition as claimed in claim 2 wherein the composition further contains a dimethicone that is essentially water insoluble, nonvolatile and has a viscosity of from about 50 centistokes (0.00005 $m^2$/sec) up to about 20,000 centistokes (0.02 $m^2$/sec) at 25° C. in an amount from about 0% to no greater than about 35 by weight of the total composition.

* * * * *